United States Patent [19]

Kamiya

[11] Patent Number: 5,721,627
[45] Date of Patent: Feb. 24, 1998

[54] SHEET TRANSPORT APPARATUS FOR DETECTING A COLOR OF A DOCUMENT

[75] Inventor: Yuji Kamiya, Yokohama, Japan

[73] Assignee: Canon Kabushiki Kaisha, Tokyo, Japan

[21] Appl. No.: 658,079

[22] Filed: Jun. 4, 1996

Related U.S. Application Data

[62] Division of Ser. No. 262,658, Jun. 20, 1994, Pat. No. 5,557,427.

[30] Foreign Application Priority Data

Jun. 21, 1993 [JP] Japan ................... 5-149297

[51] Int. Cl.$^6$ .................. H04N 1/04; H04N 1/21
[52] U.S. Cl. ................ 358/496; 358/498; 358/296; 399/82; 399/389
[58] Field of Search .................. 358/496, 498, 358/296; 355/40, 311; 399/54, 389, 81, 82

[56] References Cited

U.S. PATENT DOCUMENTS

| | | | |
|---|---|---|---|
| 4,378,109 | 3/1983 | Takahashi et al. | 271/263 |
| 4,384,794 | 5/1983 | Okano et al. | 400/56 |
| 4,927,177 | 5/1990 | Niikawa | 355/313 |
| 4,976,056 | 12/1990 | Ito | 355/311 |
| 5,001,356 | 3/1991 | Ichikawa | 356/381 |
| 5,075,622 | 12/1991 | Konii et al. | 324/229 |
| 5,130,757 | 7/1992 | Ito | 355/311 |
| 5,130,807 | 7/1992 | Tanabe et al. | 358/296 |
| 5,145,164 | 9/1992 | Kan | 271/170 |
| 5,162,853 | 11/1992 | Ito et al. | 355/311 |
| 5,331,386 | 7/1994 | Mizubata et al. | 355/319 |
| 5,339,175 | 8/1994 | Omata et al. | 358/498 |
| 5,390,005 | 2/1995 | Kimoto et al. | 355/209 |

FOREIGN PATENT DOCUMENTS

| | | |
|---|---|---|
| 051866 | 5/1982 | European Pat. Off. . |
| 081362 | 6/1983 | European Pat. Off. . |
| 63-267956 | 11/1988 | Japan ............ G03G 15/00 |
| 2-270744 | 11/1990 | Japan . |
| 4-366694 | 12/1992 | Japan . |
| 5323737 | 7/1993 | Japan . |

*Primary Examiner*—Edward L. Coles, Sr.
*Assistant Examiner*—Kimberly A. Williams
*Attorney, Agent, or Firm*—Fitzpatrick, Cella, Harper & Scinto

[57] ABSTRACT

An image forming apparatus comprises a plurality of decks for accommodating sheets, a feeder for feeding sheets from said decks, an image forming unit for forming an image on a sheet fed by said feeder, a detector for detecting thicknesses or colors of the sheets accommodated in said decks, an input unit for designating a desired thickness or color of the sheet, and a control unit for controlling said feed means to feed the sheet of the desired thickness or color from said decks.

5 Claims, 9 Drawing Sheets

1

SHEET TRANSPORT APPARATUS FOR DETECTING A COLOR OF A DOCUMENT

This application is a division of application Ser. No. 08/262,658, filed Jun. 20, 1994 now U.S. Pat. No. 5,557,427.

BACKGROUND OF THE INVENTION

1. Field of the Invention

The present invention relates to a sheet transport apparatus for transporting a sheet of a specified characteristic.

2. Related Background Art

The transport of a sheet of a specified size has been implemented in the prior art. However, the transport of a sheet of a specified thickness or tone has not been implemented.

In the past, an operator directly confirms the thickness or the tone of the accommodated sheets to determine which deck the desired sheet is accommodated in.

In the bookbinding such as the preparation of a pamphlet by using an image forming apparatus or in the preparation of a booklet having various sheets built therein, a user may desire to print on a sheet having a desired characteristic or reproduce on a sheet having the same characteristic as that of an original document sheet. In the past, for such needs, the user previously selects a sheet of a substantially same characteristic on which a reproduced image is to be outputted and then the bookbinding or the preparation of the booklet is performed manually or semi-automatically. An image forming apparatus which meets the above needs and provides consistent production was not present in the past.

In an image forming apparatus which converts image information of a facsimile apparatus or an electronic filing system to an electrical signal for reading, transmitting, receiving, image-outputting, storing and processing it, the communication of information including the characteristic of the sheet has not been conducted.

SUMMARY OF THE INVENTION

It is an object of the present invention to provide a sheet transport apparatus which eliminates the above problems.

It is another object of the present invention to provide a sheet transport apparatus which permits the transport of a sheet of a thickness or tone specified by an operator.

It is other object of the present invention to provide a sheet transport apparatus which detects a characteristic of a document sheet and transports a sheet corresponding to the detection result.

It is other object of the present invention to provide a sheet transport apparatus which permits the designation of a thickness or color of a sheet to be transported through a console unit.

Other objects of the present invention will be apparent from the following description made in conjunction with the accompanying drawings.

DETAILED DESCRIPTION OF THE PREFERRED EMBODIMENTS

Embodiments of the sheet transport apparatus of the present invention are now explained.

(First embodiment)

Figure 1:
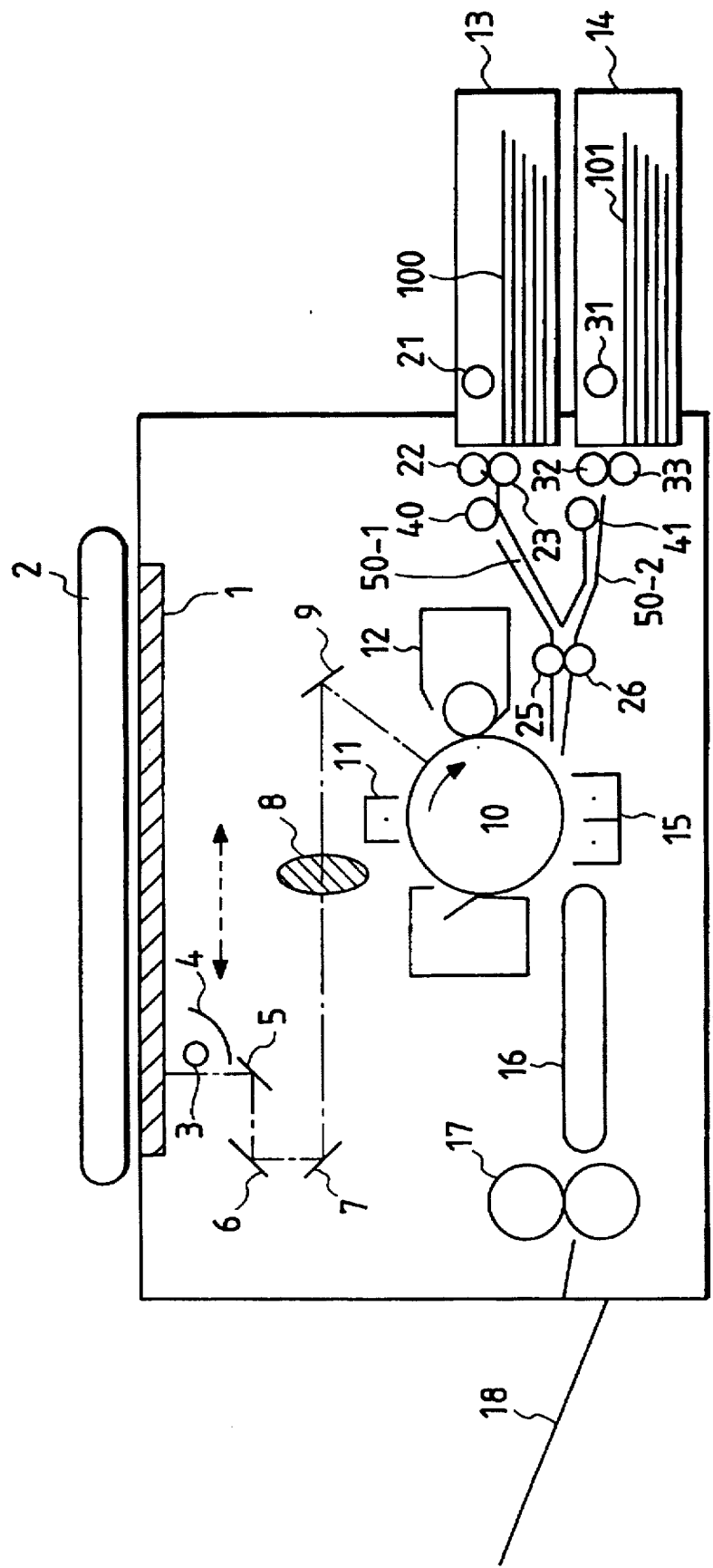
FIG. 1 shows a sectional view of a first embodiment of an image forming apparatus.

FIG. 1 shows a block diagram of an electrographic reproducing apparatus in accordance with the present invention.

A document sheet mounted between a platen glass 1 of a document sheet table and a document sheet cover 2 is illuminated by a scanning document sheet illumination lamp 3 and a reflection shade 4, and an image of the document sheet is projected to a photoconductor drum 10 by reflection mirrors 5, 6 and 7, an enlargement/reduction lens 8 and a reflection mirror 9. The photo-conductor drum 10 is charged by a primary charger 11 and a potential distribution thereof is changed in accordance with a document sheet density by the projection of the document sheet image so that a latent image of the document sheet image is formed. Then, toner is deposited to the latent image on the photo-conductor drum by a developing unit 12 to visualize the image. One of record sheets 100 and 101 stacked in sheet decks (paper feeding decks) 13 and 14 is transported and the toner on the photo-conductor drum 10 is transferred to the record sheet by a transfer and separation charger 15. The sheet is then transported by a transport belt 16 and the transferred image is fixed by a fixing unit 17. The sheet is then ejected to an ejection tray 18.

The record sheet 100 on the sheet deck 13 is transported by a first sheet feed roller 21 which is rotated in response to a feed signal from a control unit, not shown, which controls the operation of the image forming apparatus. A second sheet feed roller 22 and a retard roller 23 for preventing double feed of the sheet 100 are also rotated by the drive of the first sheet feed roller 21. The sheet is transported to the transfer and separation charger 15 by a pair of third sheet feed rollers 25 and 26. Similarly, the sheet 101 on the sheet deck 14 is transported by a first sheet feed roller 31, a second sheet feed roller 32 and a retard roller 33 through a transport path 50-2, and to the transfer and separation charger 15 by the pair of third sheet feed rollers 25 and 26.

In the present embodiment, the two sheet decks 13 and 14 are provided although three or more decks may be provided. In the present embodiment, the two sheet decks 13 and 14 accommodate the sheets of the same size. In an image forming apparatus having three or more sheet decks, the same control mechanism as that of the present embodiment may be used where a plurality of sheet decks which can accommodate the sheets of the same size are available.

As means for detecting a characteristic of the sheet, rollers 40 and 41 for measuring a thickness of the sheet are arranged between the second sheet feed roller 22 and the pair of third sheet feed rollers 25 and 26.

Figure 2:
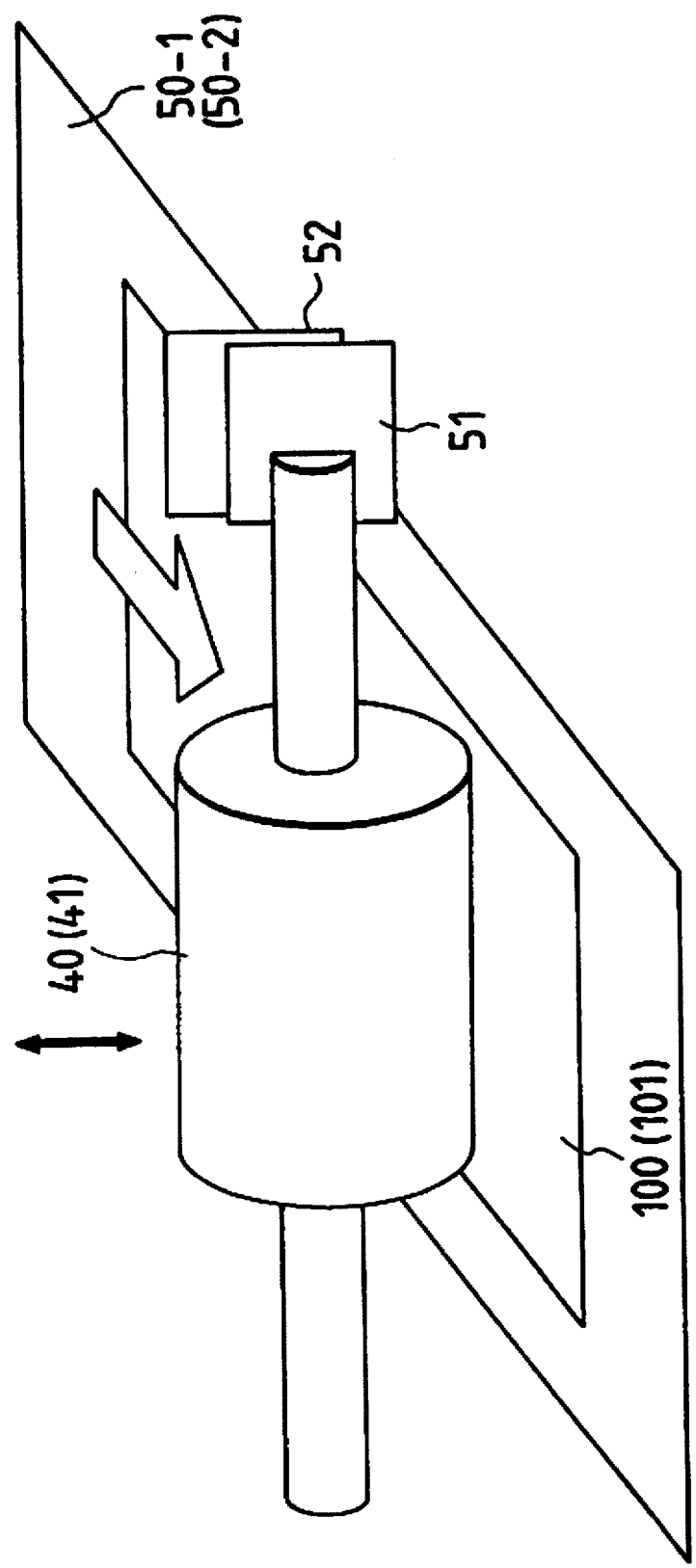
FIG. 2 shows a perspective view of a sheet thickness detector.

FIG. 2 shows a perspective view of the sheet thickness detection means. The rollers 40 and 41 are mounted on a transport path 50 and vertically float as the sheet 100 passes in the feeding direction shown by the arrow. An electrode 51 Of a capacitor is linked to the rollers so that it vertically floats in accordance with the thickness of the sheet. The other electrode 52 is fixed to a main body of the image forming apparatus. Accordingly, a change in the electrical capacitance is monitored by the capacitor 51, 52 which is physical change detection means to convert the thickness of the sheet Go an electrical signal.

Figure 3:
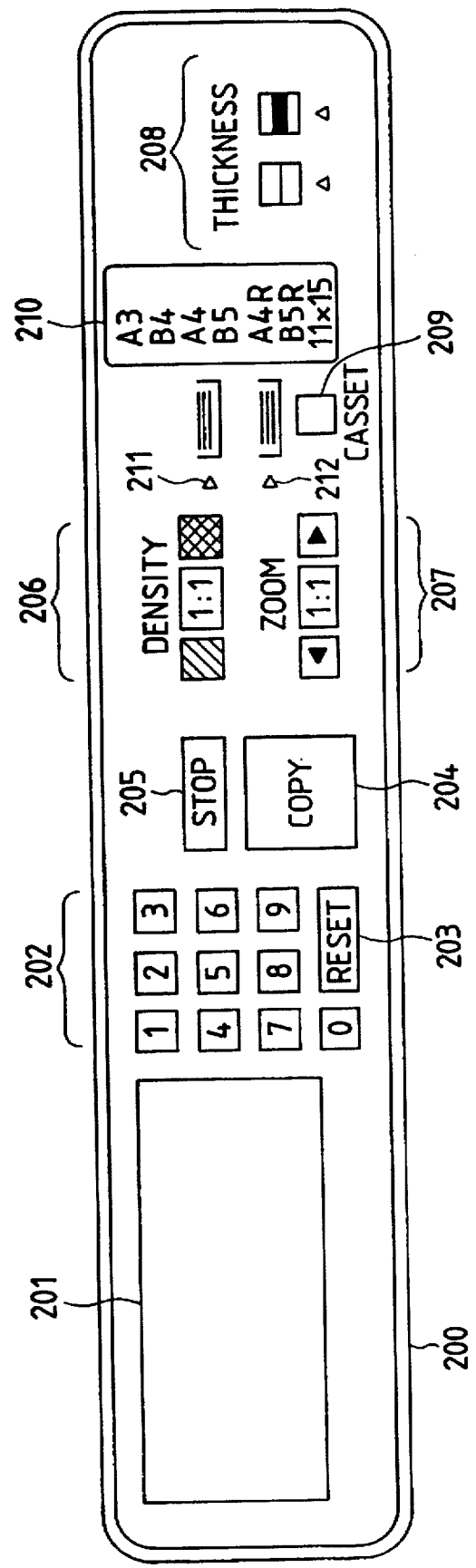
FIG. 3 shows a plan view of a console panel.

FIG. 3 shows a plan view of a console panel of the image forming apparatus. Usually, the console panel 200 is arranged at a position which is easy for a user to manipulate. In FIG. 3, numeral 201 denotes a display for displaying an input operation to the user and comprises a ten-key 202 for inputting the number of copies and a zoom magnification, a reset key 203 for resetting the settings, a copy key 204 for effecting a copy operation and a stop key 205 for stopping the copy operation. In addition, a density key 206 for adjusting a copy density and an enlargement/reduction key 207 for an output image are arranged on the console panel 200. Numeral 209 denotes a cassette selection key which is used to select one of the sheet decks 13 and 14. The size of the sheets accommodated in the selected sheet deck is displayed on a size display 210. The selected sheet deck is displayed on display 211 or 212. The size detection is conducted in a conventional manner.

In the present embodiment, sheet thickness selection keys 208 are also arranged on the console panel 200. By depressing one of the sheet thickness Selection keys 208, the sheet 100 and the sheet 101 in the sheet decks 13 and 14 are selectively fed.

Figure 4:
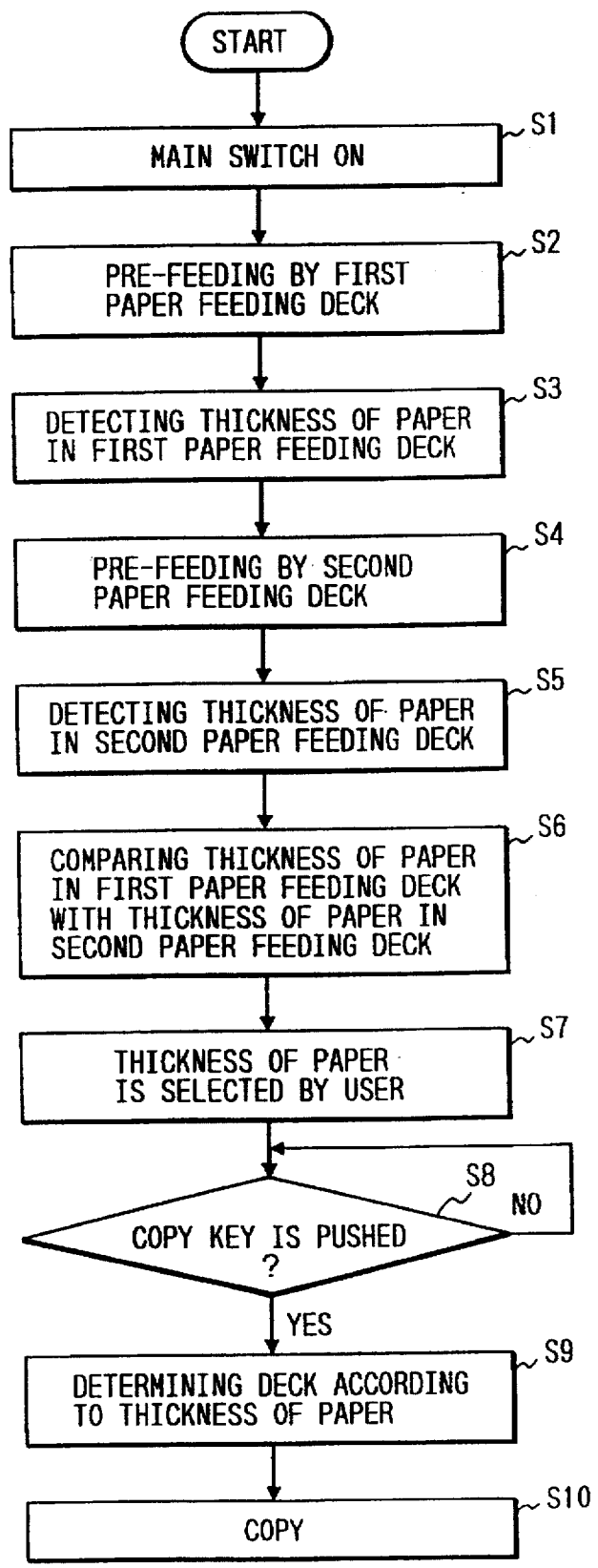
FIG. 4 shows a flow chart of the first embodiment.

FIG. 4 shows a flow chart of the selection operation of the output sheet in the first embodiment.

First, the image forming apparatus is initialized by the turn-on of the main switch (S1). Thus, the heating of the fixing unit to a predetermined temperature and the electrical self-adjustment of the document sheet illumination lamp and the charger are conducted. Then, the sheet 100 in the sheet deck 13 is pre-fed (S2). In the pre-fed, the sheet is slightly transported to a position to allow the detection by the thickness detection roller 40. The thickness of the pre-fed sheet is measured by the thickness detector shown in FIG. 2(S3). Similarly, the sheet 101 in the sheet deck 14 is pre-fed (S4) and the thickness is detected (S5).

The thickness of the sheet 100 in the sheet deck 13 is compared with the thickness of the sheet 101 in the sheet deck 14 (S6). Where the thicknesses of the sheets 100 and 101 in the sheet decks are substantially equal, they are not characterized by the thickness and the depression of the sheet thickness selection key 208 is invalidated or an alarmed to a user to disable the selection. The detection result of the thickness may be displayed on the display 201 to facilitate the input operation.

The user then conducts the copy operation. The user sets the density and the zoom magnification by using the keys on the console panel. In the present embodiment, the sheet of a desired thickness can be designated by the sheet thickness selection key 208 (S7). Usually, the thinner sheet is selected as a default but the sheet having the desired thickness may be selected without checking whether the thick sheet is accommodated in the sheet deck 13 or 14, by depressing the sheet thickness selection key 208.

After the user has set the copy condition, the user depresses the copy key 204 (S8) to determine the deck which accommodate the sheet corresponding to the designation by the sheet thickness selection key 208 (S9) and the drive of the feed rollers and the retard roller is controlled to transport the sheet from the determined deck and the copy operation is proceeded (S10).

Figure 5:
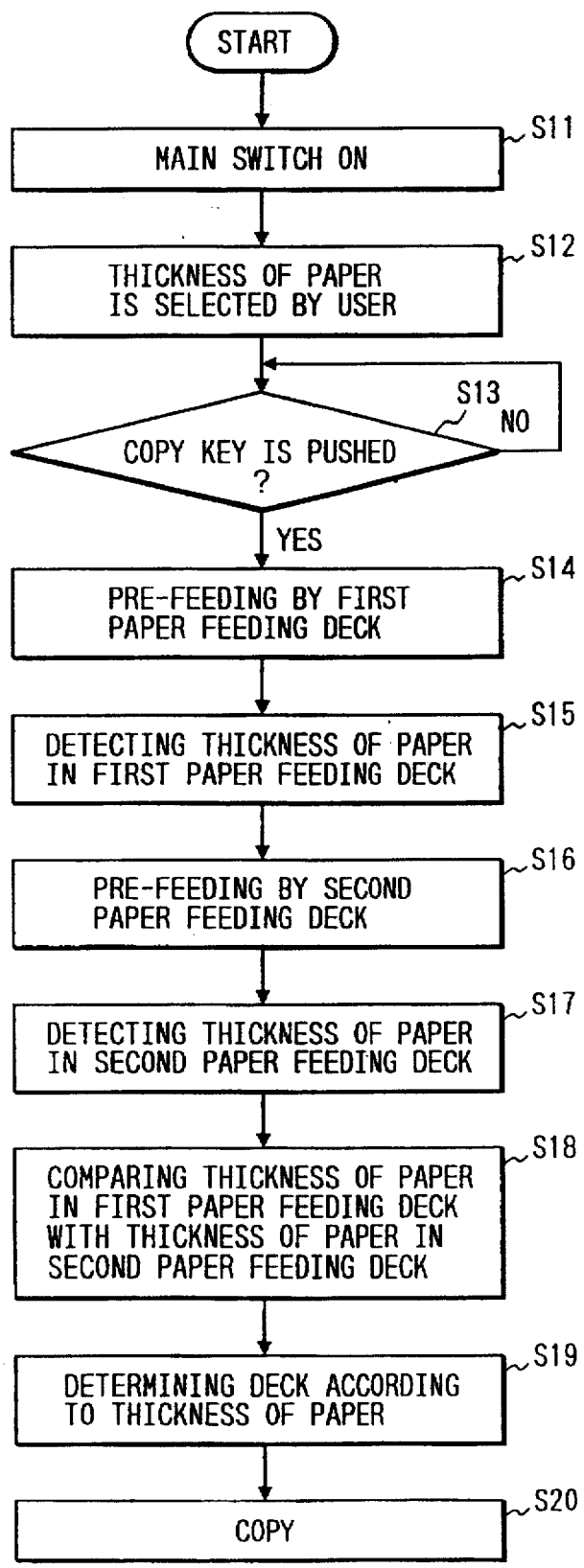
FIG. 5 shows a flow chart of the first embodiment.
Figure 6:
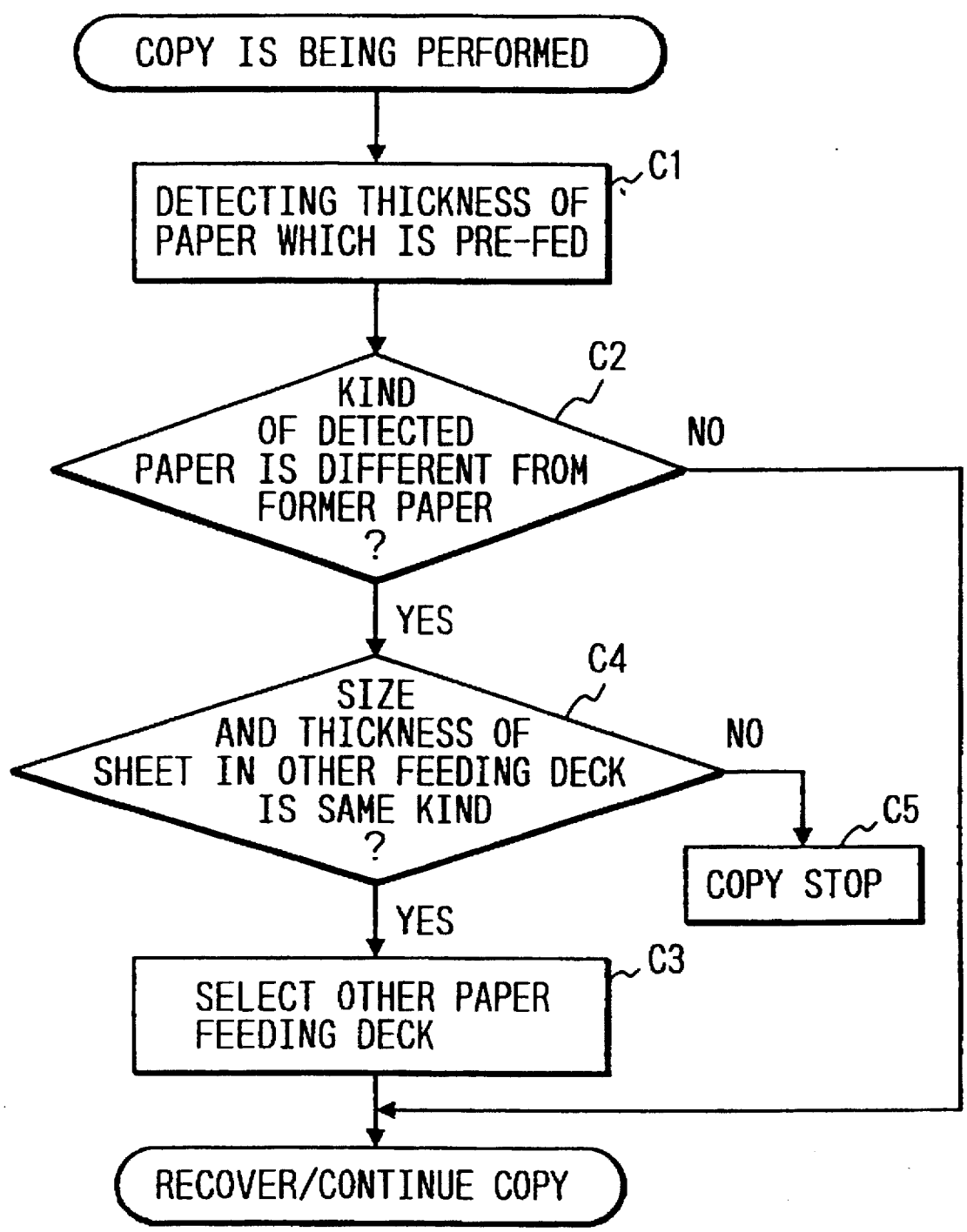
FIG. 6 shows a flow chart of the first embodiment.

FIGS. 5 and 6 show flow charts of other methods for selecting the sheet in the first embodiment.

As shown in FIG. 5, the pre-feed and the sheet thickness detection may be conducted after the depression of the copy key (S13).

A process when sheets of different recording thicknesses are present in the deck is now explained. As shown in FIG. 6, the thickness of the sheet is measured on real time during the copy operation (c1). If the measured thickness of the sheet is different from the thickness measured after the power-on (c2), the sheet feed from the currently selected deck is immediately stopped and the thickness of the sheet in the unselected deck is compared with the initial thickness of the sheet (c4). If they are equal, the sheet in the other deck is transported (c3). If they are not equal, the copy operation is interrupted and an alarm is issued (c5). This method is useful when a sheet of an ordinary thickness is selected where the sheets of different thicknesses are present in the sheet deck. It is also useful where the sheet of ordinary thickness is mixedly present when a thick sheet is to be selected.

In accordance with the present embodiment, the sheet of the designated characteristic may be selected for the output of the image.

Where the insertion of the thick sheets to cover sheets or intermediate sheets is desired in the bookbinding, the thickness selection for those pages and the designation of the pages are conducted through the console panel.

(Second embodiment)

Figure 7:
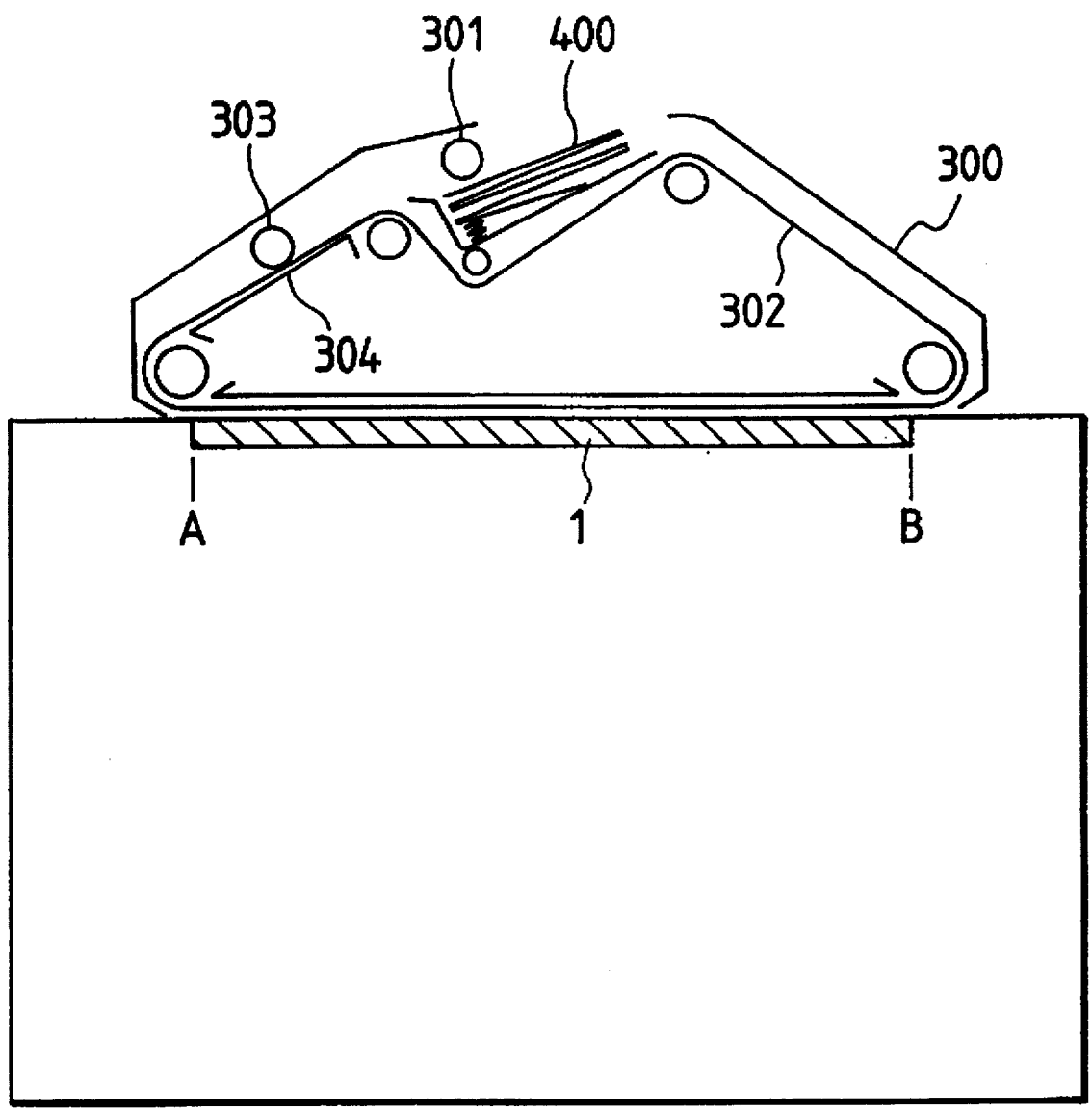
FIG. 7 shows a sectional view of a second embodiment of the image forming apparatus.

FIG. 7 shows a sectional view of a second embodiment of the image forming apparatus. It shows a sectional view of a document sheet feeder 300 which continuously feeds the document sheet to the platen glass 1 of the image forming apparatus of FIG. 1.

The document sheet feeder 300 is intended to simplify the troublesome work of mounting a plurality of document sheets on the document sheet platen glass 1 one by one and it is arranged on the image forming apparatus shown in FIG. 1. The document sheet feeder temporarily stops the document sheet on the platen glass 1 so that it is illuminated by the scanning document sheet illumination lamp 3 and the reflection shade 4, or temporarily stops the document sheet illumination lamp 3 and the reflection shade 4 so that the document sheet image is exposed and scanned while the document sheet is transported on the platen glass.

The document sheet 400 is fed one by one to the document sheet transport belt 302 by the feed roller 301. In the prior art, the document sheet is transported between A and B which is an image read section on the platen glass. In the present embodiment, the thickness of the document sheet can be detected by the thickness detection roller 303 and a retainer plate 304 (serving as second detection means) between the feed roller 301 and the point A. The sheet thickness detection method is same as that in the first embodiment. Alternatively, hardware for converting a small physical displacement to an electrical signal and further to a software variable may be used to detect the sheet thickness.

The thickness of the document sheet detected in this manner is immediately sent to the image forming apparatus shown in the first embodiment where there are a plurality of sheet accommodations means each with means for detecting sheet thickness (serving as first detection means). By sequentially selecting the sheets which correspond to the thicknesses of the respective document sheets, the copy print with the sheets having the substantially same thicknesses as those of the document sheets may be attained.

(Third embodiment)

In the first and second embodiments, the thicknesses of the sheet and the document sheet are detected and selected. In the third embodiment, the hue, brightness and color of the sheet and the document sheet are also considered.

Figure 8:
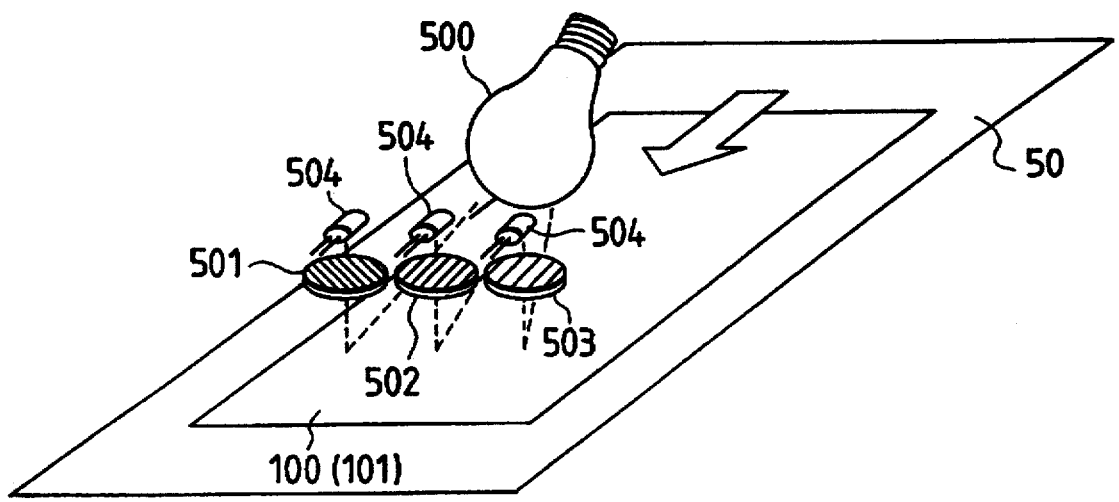
FIG. 8 shows a perspective view of a color detector in a third embodiment.

FIG. 8 shows a perspective view of sheet color detection means.

The sheet 100 (or 101) is pre-fed in the direction of the arrow to a position to permit the detection and an incandescent lamp 500 is turned on. A reflection light from the sheet 100 is color-decomposed to respective colors by a red (R) filter 501, a green (G) filter 502 and a blue (B) filter 503, and the intensities of the lights are detected by a photo-detector 504 to determine the color of the sheet based on the light intensity distributions of the three colors.

For example, if the three colors have substantially equal outputs, it is a white plain paper, and if one of the three colors has lower light intensity than others, it is violet, light blue or yellow. If the three colors are of low light intensity, it is an OHP sheet made by a transparent material or a total reflection material.

By detecting the color of the sheet and providing the color selection key in the console panel, the sheet having a desired color can be selected in the same manner as that in the first embodiment. By arranging the means for reading the color of the document sheet like the means for detecting the thickness of the document sheet in the second embodiment, the output may be prepared with the sheet having the substantially same color as that of the document sheet.

(Fourth embodiment)

Figure 9:
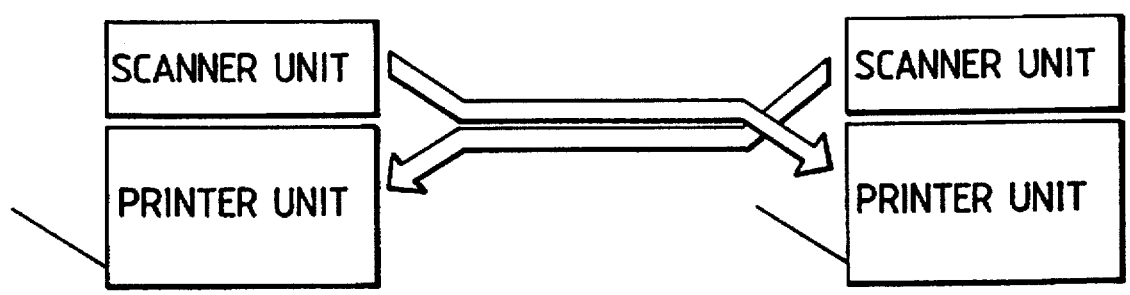
FIG. 9 shows a block diagram of a fourth embodiment.

FIG. 9 shows a block diagram of a fourth embodiment and it shows a configuration of a facsimile apparatus. The facsimile apparatus comprises a scanner unit for reading a document sheet image to be transmitted and a printer unit which is a digital printer to output a received image, and it can transmit and receive the image through a telephone line shown by the arrow.

The scanner unit may includes input means by charge coupled devices (CCD's) by the mirror scan, input means by the contact sensor scan, input means by the fixed contact sensor and the document sheet feed, or read input means by two-dimension CCD's. The print unit may include digital exposure output means such as a laser or an LED mounted on the image forming apparatus using the electrographic technology shown in the first embodiment, ink jet type output means for impacting ink by a bubble pressure, thermal head output means for writing by using a thermal sheet, or dot impact type output means.

In addition to the scanner unit and the printer unit, the fourth embodiment includes the means for detecting the characteristic of the document sheet and the sheet shown in the first, second and third embodiments.

The facsimile apparatus is operated in the known procedure such as calling of a receiving station, acknowledgement of the call of the receiving station, preparation of the transmission of the image by the transmitting station, reception of the image information, and release of call of the transmitting station. In the reception of the image information, the scanner unit in the transmitting station detects the thickness and the color of the document sheet by the arrangement shown in the second and third embodiments and sends the detection results as attribute information different from the image information in a predetermined format prior to the transmission of the image information.

On the other hand, the printer unit in the receiving station pre-detects the thickness and the color of the sheet by the arrangement shown in the first and third embodiments and selects the sheet corresponding to the characteristics of the document sheet in the received attribute information and visualizes the image thereon. The scanner unit may be constructed to transmit the sheet characteristic designated by the user as it is in the first embodiment. If one of the scanner unit in the transmitting station and the printer unit in the receiving station is not provided with the characteristic detection means or the designation means, the characteristic information may be disregard and the output may be made in a conventional manner.

In the present embodiment, it is possible to designate a characteristic of the sheet to a printer represented by a remote facsimile apparatus so that more user-friendly image output is attained.

Figure 10:
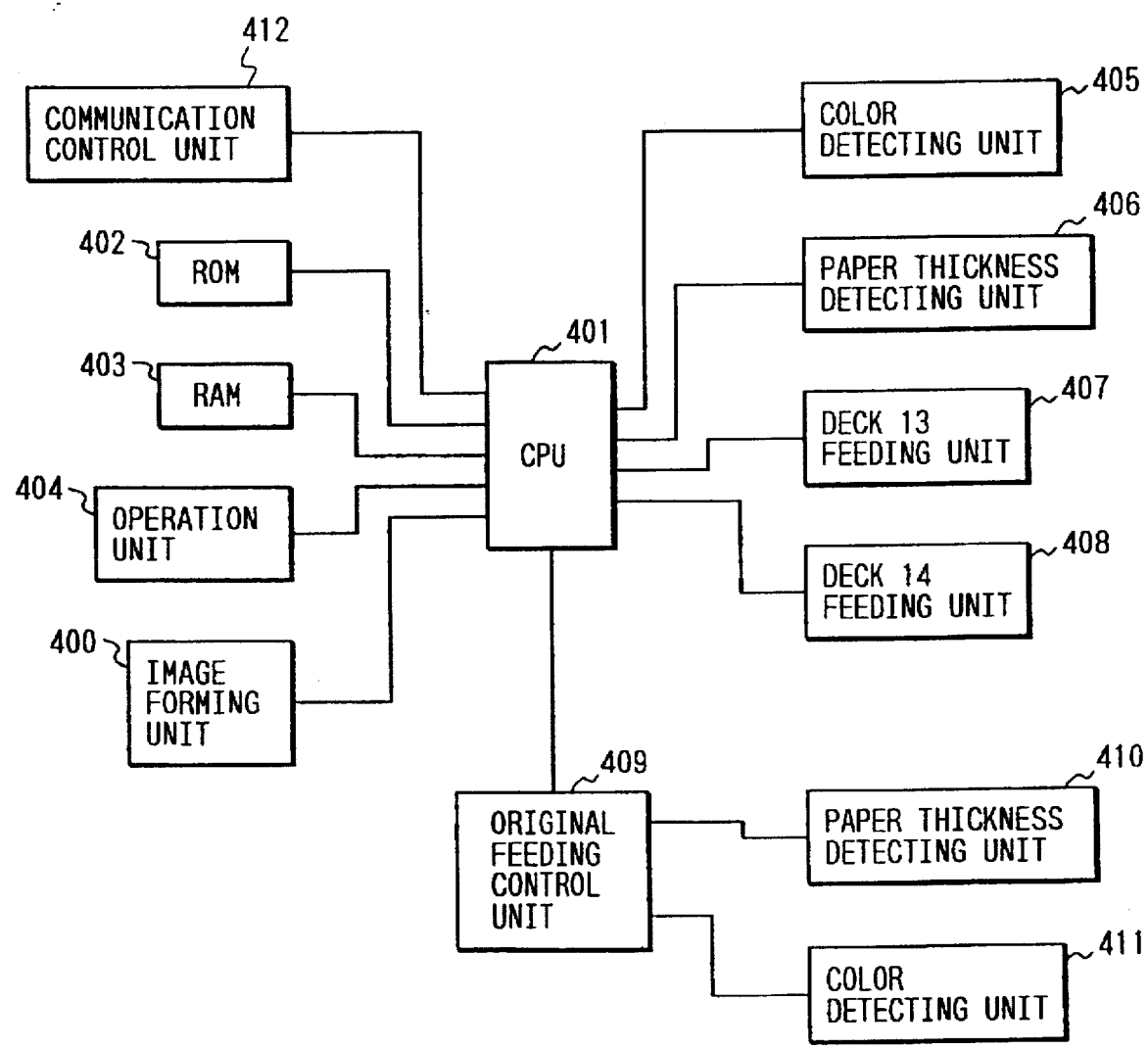
FIG. 10 shows a block diagram of an image forming apparatus of the present invention.

FIG. 10 shows a block diagram of the image forming apparatus of the present invention.

Numeral 400 denotes an image forming unit for exposing a document sheet and recording an image, numeral 401 denotes a CPU for controlling the overall apparatus, numeral 402 denotes a ROM which stores control programs including processes of the flow charts shown in FIGS. 4 to 6 and control data, numeral 403 denotes a RAM which serves as a work area for the CPU 401 and stores various data, and numeral 404 denotes a console unit shown in FIG. 3 which controls the entry of various keys and the display. Numeral 405 denotes a color detector shown in FIG. 8 which includes elements 500 to 504. Numeral 406 denotes a sheet thickness detector shown in FIG. 2 which includes the rollers 40 and 41 and the capacitor electrodes 51 and 52. Numerals 407 and 408 denote transport units for controlling the transport of the sheets from the decks 13 and 14, respectively, and include motors for driving the rollers. Numeral 409 denotes a control unit for the document sheet feeder shown in FIG. 7 which controls the transport of the document sheet and outputs the thickness data and the color data of the document sheet to the CPU 401. Numeral 410 denotes a sheet thickness detector similar to 406, and numeral 411 denotes a color detector similar to 405. Numeral 412 denotes a communication control unit for transmitting to and receiving from other image forming apparatus or facsimile apparatus.

The block diagram of FIG. 10 is common to all embodiments and unnecessary components in the respective embodiments may be neglected. (For example, 405, 409, 410, 411 and 412 in the first embodiment.)

It should be understood that the present invention is not limited to the above embodiment but various modifications thereof may be made without departing from the scope of the claims.

What is claimed is:

1. An image forming apparatus comprising:

a plurality of accommodation means for accommodating color recording sheets;

feed means for feeding recording sheets from said plurality of accommodation means;

image forming means for forming an image on a recording sheet fed by said feed means;

detection means for detecting colors of the recording sheets accommodated in said plurality of accommodation means;

key input means for designating manually a desired color of the recording sheet; and control means for automatically selecting one of said plurality of accommodation means so as to feed the recording sheet of the desired color on the basis of a designation from said key input means and a detection result of said detection means.

2. An image forming apparatus comprising:

exposure means for exposing a document sheet;

a plurality of accommodation means for accommodating color recording sheets;

sheet feed means for feeding recording sheets from said plurality of accommodation means;

image forming means for forming an image of the document sheet exposed by said exposure means on the sheet fed by said sheet feed means;

first detection means for detecting colors of the sheets accommodated in said plurality of accommodation means;

second detection means for detecting a color of the document sheet; and control means for automatically selecting one of said plurality of accommodation means so as to feed the sheet of a color corresponding to the color of the document sheet based on detection results of said first and second detection means.

3. A control method of an image forming apparatus including a plurality of accommodation means for accommodating color recording sheets, feed means for feeding recording sheets from said plurality of accommodation means, and image forming means for forming an image on a recording sheet fed by said feed means, comprising steps of:

detecting colors of the recording sheets accommodated in said plurality of accommodation means;

designating manually a desired color of the recording sheet by a color selection key; and selecting automatically one of said plurality of accommodation means so as to feed the recording sheet of the desired color on the basis of a designation in said designating step and a detection result in said detecting step.

4. A control method of an image forming apparatus including exposure means for exposing a document sheet, a plurality of accommodation means for accommodating color recording sheets, sheet feed means for feeding recording sheets from said plurality of accommodation means, and image forming means for forming an image of the document sheet exposed by said exposure means on the recording sheet fed by said sheet feed means, comprising steps of:

detecting colors of the recording sheets accommodated in said plurality of accommodation means;

detecting a color of the document sheet; and selecting automatically one of said plurality of accommodation means so as to feed the recording sheet of a color corresponding to the color of the document sheet based on each detection results in said two detecting steps.

5. A control method of an image forming apparatus including receiving means for receiving an image of a document and control information transmitted from an image transmitting unit, recording means for recording the image received by said receiving means on a recording sheet, a plurality of accommodation means for accommodating color recording sheets, and sheet feed means for feeding recording sheets from said plurality of accommodation means, comprising steps of:

receiving the image of the document and document sheet color information representing color of the document sheet transmitted from the image transmitting unit;

detecting the color of the recording sheet accommodated in said plurality of accommodation means; and selecting automatically one of said plurality of accommodation means so as to feed the recording sheet of a color corresponding to the color of the document sheet, on the basis of the document sheet color information received in said receiving step and the color of the recording sheet detected in said detecting step.

* * * * *

UNITED STATES PATENT AND TRADEMARK OFFICE
CERTIFICATE OF CORRECTION

PATENT NO. : 5,721,627
DATED : February 24, 1998
INVENTOR(S) : Yuji KAMIYA

It is certified that error appears in the above-indentified patent and that said Letters Patent is hereby corrected as shown below:

<u>Title Page</u>, [56] References Cited, Foreign Patent Documents, sixth entry, delete "5323737" and insert therefor --5-323737--.

<u>Column 1</u>, lines 46 and 50, delete "other", both occurrences, and insert therefor --another--.

<u>Column 3</u>, line 8, delete "Go" and insert therefor --to--;
Line 26, delete "Selection" and insert therefor --selection--.

<u>Column 4</u>, line 54, after "is", insert --the--.

<u>Column 5</u>, line 37, delete "arrow" and insert therefor --arrows--.

Signed and Sealed this

Eleventh Day of August 1998

Attest:

BRUCE LEHMAN

Attesting Officer

Commissioner of Patents and Trademarks